Jan. 4, 1949.  W. R. BURTLE  2,458,057

POWER TRANSMISSION BELT

Filed Aug. 22, 1945

Inventor

William R. Burtle,

By Clarence A. O'Brien
and Harvey B. Jacobson
Attorneys

Patented Jan. 4, 1949

2,458,057

UNITED STATES PATENT OFFICE 2,458,057

POWER TRANSMISSION BELT

William R. Burtle, Upper Darby, Pa.

Application August 22, 1945, Serial No. 611,994

2 Claims. (Cl. 74—238)

This invention relates to power transmission belts of the round type adapted for use on light machinery, such as power sewing machines, printing presses, and the like.

The primary object of the present invention is to provide a belt of the above kind which is so constructed as to satisfactorily fulfill the requirements for successful commercial use.

A more specific object of the invention is to provide an efficient belt of the above kind embodying a continuous belt member composed of a metallic twisted-strand cable or cord having a covering of rubber-like material thereon and bonded thereto, and efficient means for coupling the ends of the belt member.

Figure 1:
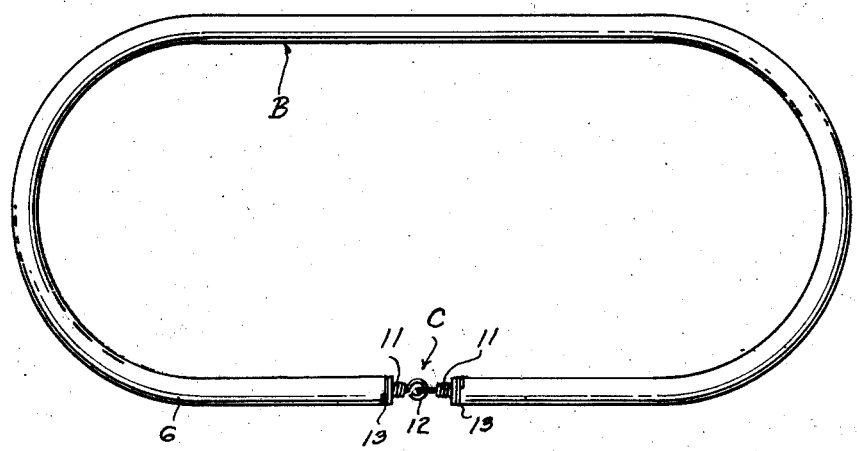
Figure 2:
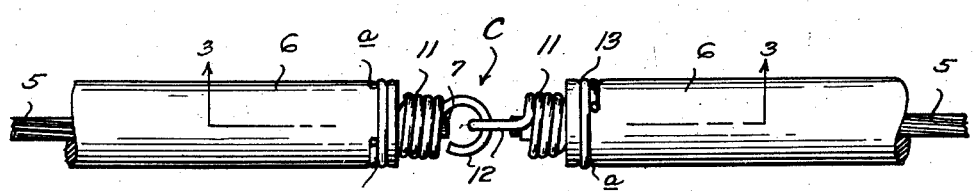
Figure 3:
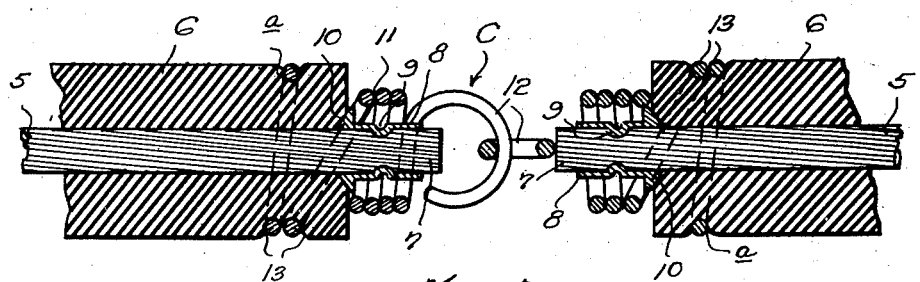

The exact nature of the present invention, as well as other objects and features thereof, will become apparent from the following description when considered in connection with the accompanying drawing, in which:

Figure 1 is an elevational view of a power transmission belt constructed in accordance with the present invention, Figure 2 is an enlarged fragmentary elevational view more clearly showing the manner of coupling the ends of the belt member forming part of the belt shown in Figure 1, and Figure 3 is an enlarged section taken on line 3—3 of Figure 2.

There have been a number of attempts in the past to produce a satisfactory power transmission belt of the round type for use on light machinery. So far, about the only belt of this kind that has worked with any considerable degree of success is the type comprising a leather belt member and a fastener for securing the ends of the belt member together. There are, however, many objections to a belt including a belt member made of this material, such as excessive stretching, cracking, and inability to hold the fastener. Requirements are that the belts be of such a nature that the user may readily make them up in various sizes with a minimum amount of time, effort and equipment, the belt must be so constructed that it will operate satisfactorily over a relatively long period of time at high speeds, under high tension, and over pulleys of small diameter, and the belt must not stretch, must be able to hold a fastener effectively, and must effectively resist the action of lubricants, heat and abrasion, as well as to be extremely flexible and easy to handle.

To satisfy the above requirements, I have provided the novel belt shown in the accompanying drawing, which belt includes an elongated continuous belt member B composed of a metallic twisted-strand cable or cord 5 having a covering 6 of rubber-like material thereon and bonded thereto. The cable or cord 6 thus forms the core or tension-receiving member of the belt, and it is of such a nature that it is freely flexible in all directions, will stand the tension involved without elongation, and will withstand severe flexing over small pulleys. The covering 6 is of uniform diameter and may be bonded securely to the core in the process of manufacture by coating the core with a bonding agent prior to extruding the covering over the core. The covering is also of such a character that it will withstand severe flexing without cracking, and it has a high resistance to wear, and will withstand heat and oil or other lubricants. It further is preferably of a porous nature so that, in operation, it will retain a small portion of the lubricant with which it comes in contact. I have found that certain synthetic rubber compositions possess the necessary characteristics. In this connection, it is pointed out that most round belts are run crossed so that one strand of the belt rubs on the other, thus resulting in severe wear proportional to the tension involved and the speed of travel of the belt. By applying a small amount of lubricant to the belt, this wear is substantially eliminated, and effective lubrication of the belt is insured by using a porous covering which will retain a portion of the lubricant.

The coupling of the ends of the belt member B also presents a major problem. If any type of mechanical fastener is applied directly to the core 5, the pounding set up as the fastener or coupling passes over the pulleys will cause a fracture of the core due to fatigue of the small wires of which it is formed. On the other hand, if the coupling is applied to the covering material, withstanding of the load of the drive is then dependant upon the bond between the cover and the core and upon the tensile strength of the covering itself. Accordingly, a coupling applied in the latter manner will cause tearing of the cover or stripping of the latter from the core. I have found that unless the ends of the core are secured, the wires or strands thereof will unlay when placed under stress. These problems are solved by the use of a coupling constructed and applied substantially as illustrated in Figure 1, and more clearly shown in Figures 2 and 3, the coupling being generally designated by the character C.

As shown, the belt member B is made of the desired length, whereupon portions of the covering 6 are removed from the core 5 so as to provide the latter with projecting ends as at 7.

The sleeve members 8 of metallic caps are then fitted on the projecting ends 7 of the core and crimped, as at 9, so as to secure them in place and effectively grip the core so that unlaying of the strands of the latter is prevented when the belt is placed under tension. Each cap further includes a rounded head 10 on the inner end of the sleeve 8 and of lesser diameter than the covering 6. In application, the head of each cap is placed against the end of the covering and the core is extended through the head and the sleeve of each cap. Thus, when the sleeve of the cap is secured to the core by crimping, the head of the cap serves as a stop to keep the covering from stripping from the core.

The coupling C includes two short helical springs 11, each having a hook 12 formed on one end thereof and normally having a few of the convolutions thereof at the other end expanded to a diameter slightly larger than that of the covering 6, the remaining convolutions being of smaller diameter than said covering. One spring member is placed so that its smaller convolutions surround each projecting end of the core and the adjacent cap, and so that the expanded convolutions of the spring surround the adjacent end of the covering 6. When thus position, the hook of this spring member projects beyond the end of the core 5. The expanded convolutions of the spring are then contracted so as to securely fasten the spring to the associated end of the covering 6 with the convolutions embedding themselves in the covering, as generally indicated at $a$ in Figure 3. With a spring member thus securely applied and anchored to the covering 6 at each end of the belt member B, the hooks 12 of the two spring members are interengaged or interlocked, as shown in the drawing, so as to effectively connect the ends of the belt member and provide a yielding connection therebetween, which is freely flexible substantially in all directions and which only necessitates a comparatively short space between the ends of the covering. By this arrangement, the belt member may be passed around the pulleys and then the ends of the belt member may be readily connected to easily apply and complete formation of the belt. When the convolutions 13 are expanded, they are also extending slightly from the remaining convolutions for obvious reasons. It is pointed out that the smaller convolutions of each spring member possess limited elasticity so that the belt will not readily or materially elongate when placed under tension or longitudinal stress. The hinged-like connection between the spring members and the slight flexibility of the latter are sufficient to permit the coupling to readily conform to the curvature of pulleys over which the belt is caused to travel. With the secure hold that the spring members have on the covering 6, tension applied to the belt will cause the portion of the cover between the convolutions 13 and the head 10 of the cap to compress and enlarge somewhat in diameter, thereby locking the coupling more securely to the belt and transferring the load to the core 5.

From the foregoing description, it is believed that the construction, operation, and advantages of the present invention will be readily understood and appreciated by those skilled in the art. Minor changes may be made in details of construction illustrated and described, such as fall within the scope of the invention as claimed.

What I claim is:

1. A power transmission belt of the round type comprising a belt member embodying a metallic twisted-strand core and a rubber-like covering of uniform diameter disposed on and bonded to the core, the ends of said core projecting beyond the ends of the covering, caps secured on the projecting ends of the core to prevent unlaying of the strands thereof and including heads of lesser diameter than and abutting the ends of the covering to prevent stripping of the covering from the core, and coupling members for the ends of the belt anchored to the ends of the covering and free of connection with the core, each coupling member consisting of a spring having convolutions at one end of smaller diameter than the core and surrounding the adjacent projecting end of the core and the associated cap and other convolutions surrounding and imbedded in the covering to anchor the spring member to the belt member.

2. A power transmission belt of the round type comprising a belt member embodying a metallic twisted-strand core and a rubber-like covering of uniform diameter disposed on and bonded to the core, the ends of said core projecting beyond the ends of the covering, caps secured on the projecting ends of the core to prevent unlaying of the strands thereof and including heads of lesser diameter than and abutting the ends of the covering to prevent stripping of the covering from the core, and coupling members for the ends of the belt anchored to the ends of the covering and free of connection with the core, the coupling means including two spring members having inter-engaged hooks at one end, convolutions of the spring members adjacent the hooks being of smaller diameter than that of the covering and disposed in surrounding relation to the projecting ends of the core, and other convolutions of the spring members at the ends opposite the hooks being of larger diameter and surrounding and imbedded in the covering.

WILLIAM R. BURTLE.

REFERENCES CITED

The following references are of record in the file of this patent:

UNITED STATES PATENTS

| Number | Name | Date |
|---|---|---|
| 1,247,174 | Sunderland | Nov. 20, 1917 |
| 1,854,252 | Freedlander | Apr. 19, 1932 |
| 1,980,437 | Reeves | Nov. 13, 1934 |
| 2,038,469 | Bannister | Apr. 21, 1936 |

FOREIGN PATENTS

| Number | Country | Date |
|---|---|---|
| 149,496 | Switzerland | Nov. 16, 1931 |
| 452,553 | France | May 19, 1913 |